United States Patent
Liyanaratchi

(10) Patent No.: US 10,904,372 B2
(45) Date of Patent: Jan. 26, 2021

(54) PHONE STORAGE AND ACCESS SYSTEM

(71) Applicant: RA CORPORATION PTY LTD, Caringbah (AU)

(72) Inventor: Rohan Liyanaratchi, Victoria (AU)

(*) Notice: Subject to any disclaimer, the term of this patent is extended or adjusted under 35 U.S.C. 154(b) by 0 days.

(21) Appl. No.: 16/470,408

(22) PCT Filed: Dec. 22, 2017

(86) PCT No.: PCT/AU2017/000287
§ 371 (c)(1),
(2) Date: Jun. 17, 2019

(87) PCT Pub. No.: WO2018/112503
PCT Pub. Date: Jun. 28, 2018

(65) Prior Publication Data
US 2020/0112629 A1    Apr. 9, 2020

(30) Foreign Application Priority Data

Dec. 23, 2016    (AU) .................... 2016905349

(51) Int. Cl.
*H04M 1/04*    (2006.01)
*A45F 5/00*    (2006.01)
(Continued)

(52) U.S. Cl.
CPC ............... *H04M 1/04* (2013.01); *A45C 11/00* (2013.01); *A45F 5/00* (2013.01); *H04B 1/385* (2013.01);
(Continued)

(58) Field of Classification Search
CPC .... H04M 1/04; A45C 11/00; A45C 2011/002; A45F 5/00; A45F 2005/008; A45F 2200/0516; H04B 1/385; H04B 2001/3861
(Continued)

(56) References Cited

U.S. PATENT DOCUMENTS 6,696,986 B1 *    2/2004    Harrison, Jr. ........... G06F 1/163
224/219
2007/0054555 A1    3/2007    Yeh
(Continued)

FOREIGN PATENT DOCUMENTS

CN    2867960 Y    2/2007
DE    20316402 U1    9/2004

OTHER PUBLICATIONS

Patent Cooperation Treaty; PCT/AU2017/000287; Written Opinion of the International Searching Authority; dated Mar. 14, 2018.

*Primary Examiner* — Lee Nguyen
(74) *Attorney, Agent, or Firm* — Wiggin and Dana LLP; Gregory S. Rosenblatt; Jonathan D. Hall

(57) ABSTRACT

There is disclosed a body worn mounting system (10) for a smart phone (30). The system (10) comprises a band member (12) attachable about an arm of a user. A track member (14) is mounted to the band member (12) and configured to extend at least partially along the forearm of the user. The track member (14) is configured to engage with the smart phone (30) such that the smart phone (30) is free to travel along the track member (14) between predetermined positions on the track member (14). Motion is applied to the smart phone (30) through the application of a hand motion which applies a force to the smart phone (30) causing the smart phone (30) to travel about the track member (14).

6 Claims, 6 Drawing Sheets

(51) Int. Cl.
*A45C 11/00* (2006.01)
*H04B 1/3827* (2015.01)

(52) U.S. Cl.
CPC ... *A45C 2011/002* (2013.01); *A45F 2005/008* (2013.01); *A45F 2200/0516* (2013.01); *H04B 2001/3861* (2013.01)

(58) Field of Classification Search
USPC .............................. 455/575.6, 569.1, 569.2
See application file for complete search history.

(56) References Cited

U.S. PATENT DOCUMENTS

| | | | |
|---|---|---|---|
| 2009/0321483 A1 | 12/2009 | Froloff | |
| 2011/0303710 A1* | 12/2011 | Yu | A45F 5/00 224/219 |
| 2017/0013950 A1* | 1/2017 | Rieger | F16M 13/00 |

* cited by examiner

PHONE STORAGE AND ACCESS SYSTEM

RELATED APPLICATIONS

The present application claims priority from Australian Provisional patent Application No. 2016905349, filed 23 Dec. 2016, the entire contents of which are incorporated herein by reference.

FIELD OF INVENTION

The present invention relates generally to a system and apparatus for storing and accessing a phone, such as a smart phone on a human body, more particularly, the present invention resides in a system and apparatus for carrying a smart phone on a user's forearm for ready access by way of a simple body movement.

BACKGROUND OF THE INVENTION

Mobile phones, particularly smart phones, are fast becoming an essential personal item. Most individuals use smart phones as an integral part of their work and leisure activities, with the device being carried by the individual with as much importance as a traditional wallet or purse. As smart phones perform multiple functions other than merely taking and receiving calls, the need to have ready access to the smart phone is important and in some instances, the smart phone is fast becoming a replacement for a wallet or purse.

Whilst the technology of smart phones has increased, the size of such devices has not necessarily decreased. Rather, for convenience of use, smart phones have adopted a size that enables the screen to be used to view videos and the like, and for reading emails and texts. Thus, many smart phones may be too large to place in a shirt pocket or inside a jacket, resulting in many individuals carrying the phone as a separate item. This has downsides as the smart phone can be easily dropped or misplaced, and as it is generally placed on a table or desk, it can readily be viewed by others. This aspect may be problematic in a meeting environment where all participants have their phones placed beside them on a table and should one or more participant receive a call or text, the phones may vibrate and become a distraction for all participants.

Thus, there is a need to provide a mounting device that can be worn on an arm of a user that is able to accommodate a phone device and which is able to provide a means for moving the phone from a concealed position into a usable position by a simple motion of the user's hand.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided a body worn mounting system for a smart phone comprising:
  a band member attachable about an arm of a user;
  a track member mounted to the band member and configured to extend at least partially along the forearm of the user, the track member being configured to engage with the smart phone such that the smart phone is free to travel along the track member between predetermined positions on the track member;
  wherein, the smart phone is moved through the application of a hand motion which applies a force to the mobile phone causing the mobile phone to travel about the track member.

In an embodiment, the band member may be attachable about a wrist of the user. One end of the track member may be mounted to an outer surface of the band member to extend along an inner surface of the forearm of the user away from the user's hand.

The track member may be further configured to extend around the user's arm at a distal end thereof, said distal end being opposite the end of the track member mounted to the band member.

The track member may comprise a telescopically extendible portion that extends from the end mounted to the other surface of the hand member so as to extend beyond the hand of the user to facilitate positioning of the smart phone at a location to take self-images of the user from a camera system associated with the smart phone.

The track member may comprise a hollow tubular member having a slot formed on an outer surface of the hollow tubular member to facilitate mounting of the smart phone thereto.

A locating member may be mounted to a rear surface of the smart phone and is configured to engage with the track member so as to slide along said slot formed in the hollow tubular member. The locating member may comprise a ball portion mounted on a stem portion and the ball portion may be configured to be captured within the slot to facilitate said sliding motion upon said application of the hand motion by the user.

The track member may comprise retaining elements provided therein for gripping the locating member and retaining the smart phone in position with respect to the user's arm.

BRIEF DESCRIPTION OF THE DRAWINGS

The invention may be better understood from the following non-limiting description of preferred embodiments, in which.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

Figure 1:
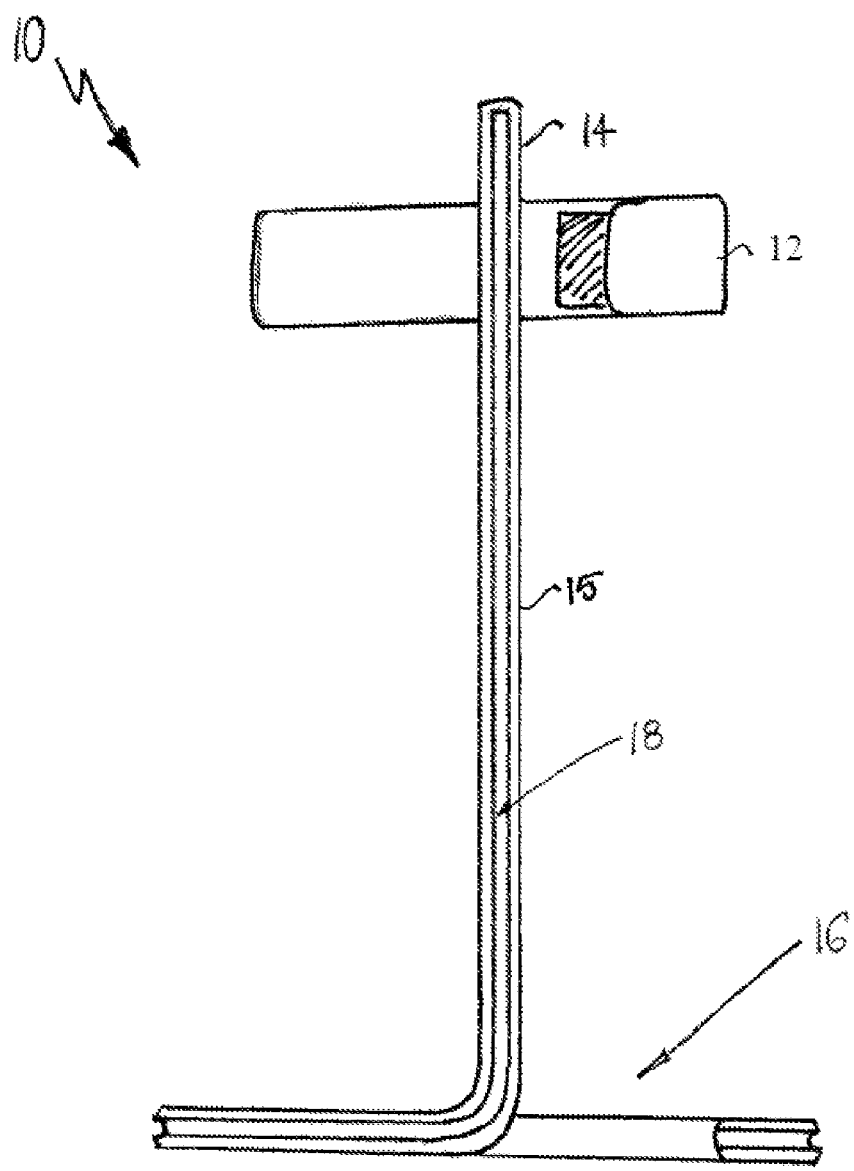
FIG. 1 is a plan view of a mounting arrangement to be worn by a user for mounting a phone for use in accordance with an embodiment of the present invention.

According to a first embodiment, FIG. 1 depicts a mounting arrangement 10 in isolation. The mounting arrangement 10 comprises a wrist band 12 in the form of a band made of a soft, flexible fabric that is configured to be fitted around a wrist of the user. Wrist band 12 comprises a single length of fabric band having a fastening means 13 attached to ends thereof. In the embodiment as depicted, the fastening means 13 is a hook and loop fastener arrangement, such as Velcro®, although other types of fasteners are also envisaged, such as press-studs, rivets and the like. Whilst not shown, it will be appreciated that the length of the strap forming the wrist band 12 may be adjustable to accommodate different sized wrists.

Figure 5:
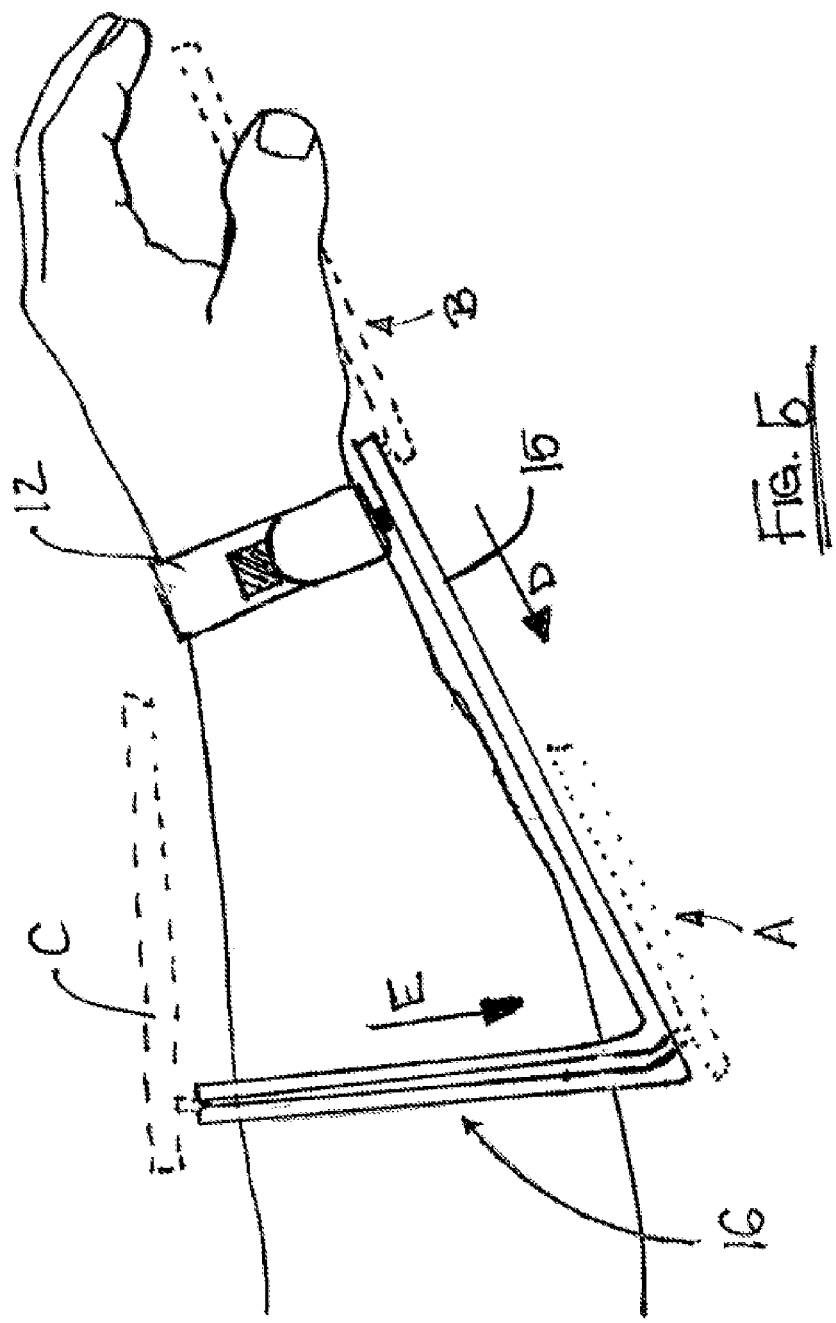
FIG. 5 is side view of the embodiment of FIGS. 1-4 in use.

A track member 14 is attached to an outer surface of the wrist band 12. The track member 14 has a straight portion 15 that, when attached to a user's wrist, extends along an inner surface of the user's forearm away from the hand of the user, as is shown in FIG. 5. The end portion 16 of the track member 14 has an arc or circular portion that extends substantially perpendicular to the straight portion 15 and around the forearm of the user, as is shown in FIG. 5. It will be appreciated that when the mounting arrangement 10 is worn by a user, the track member 14 extends from just below the users hand to the region of the user's forearm before the elbow.

The track member 14 is preferably made from a rigid plastic material that retains the shape of the track member when worn. Alternatively, the track member 14 may be made from a metal material so as to provide a sleek metallic look. The track member 14 has a hollow, tubular form and has a slot or opening 18 formed in the external surface thereof that extends the length of the track member 14. The slot 18 is in the form of a narrow opening that provides access into the hollow tubular body of the track member 14 to form a channel along which a mobile phone can travel in a manner to be described in more detail below. The track member 14 may have retaining elements 20 located in specific locations along the slot 18 of the track member 14. The retaining elements 20 may be spring loaded projections mounted within the hollow tubular body that function to grip or hold the mobile phone in position to prevent it from freely sliding further along the slot 18. The retaining elements 20 are generally positioned within the track members 14 at locations where the phone is to be retained or maintained in position.

Figure 2:
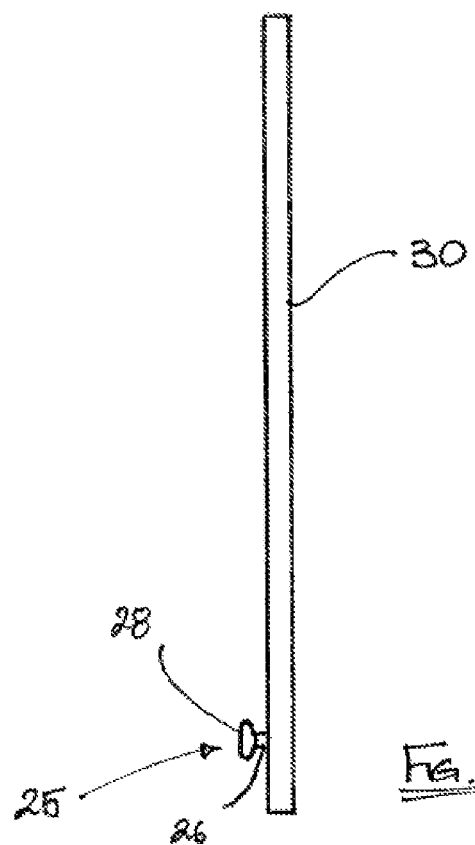
FIG. 2 is a side view of a mobile phone adapted for use with the mounting arrangement of FIG. 1 in accordance with an embodiment of the present invention.
Figure 3:
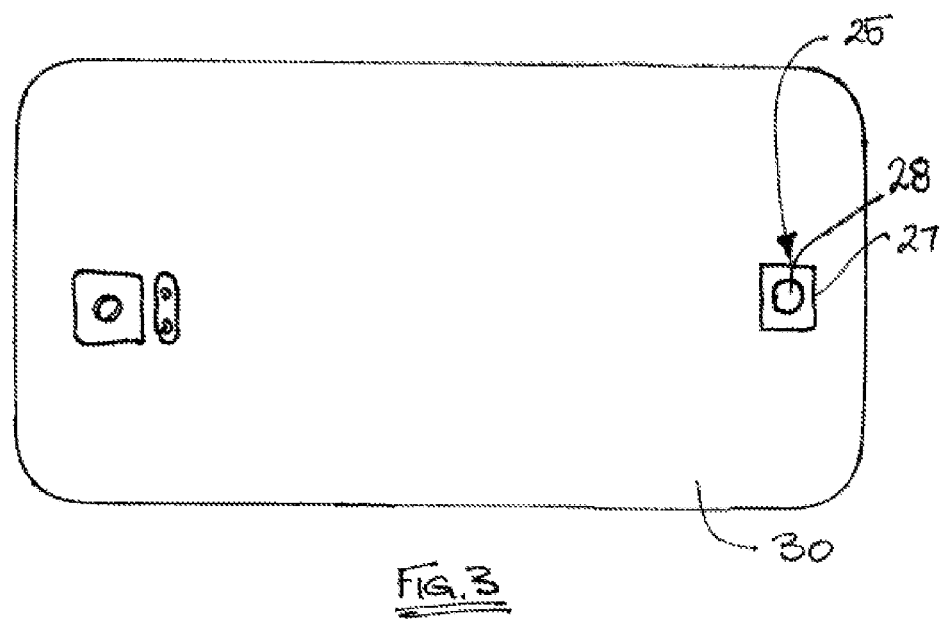
FIG. 3 is a rear view of the mobile phone of FIG. 2.
Figure 4:
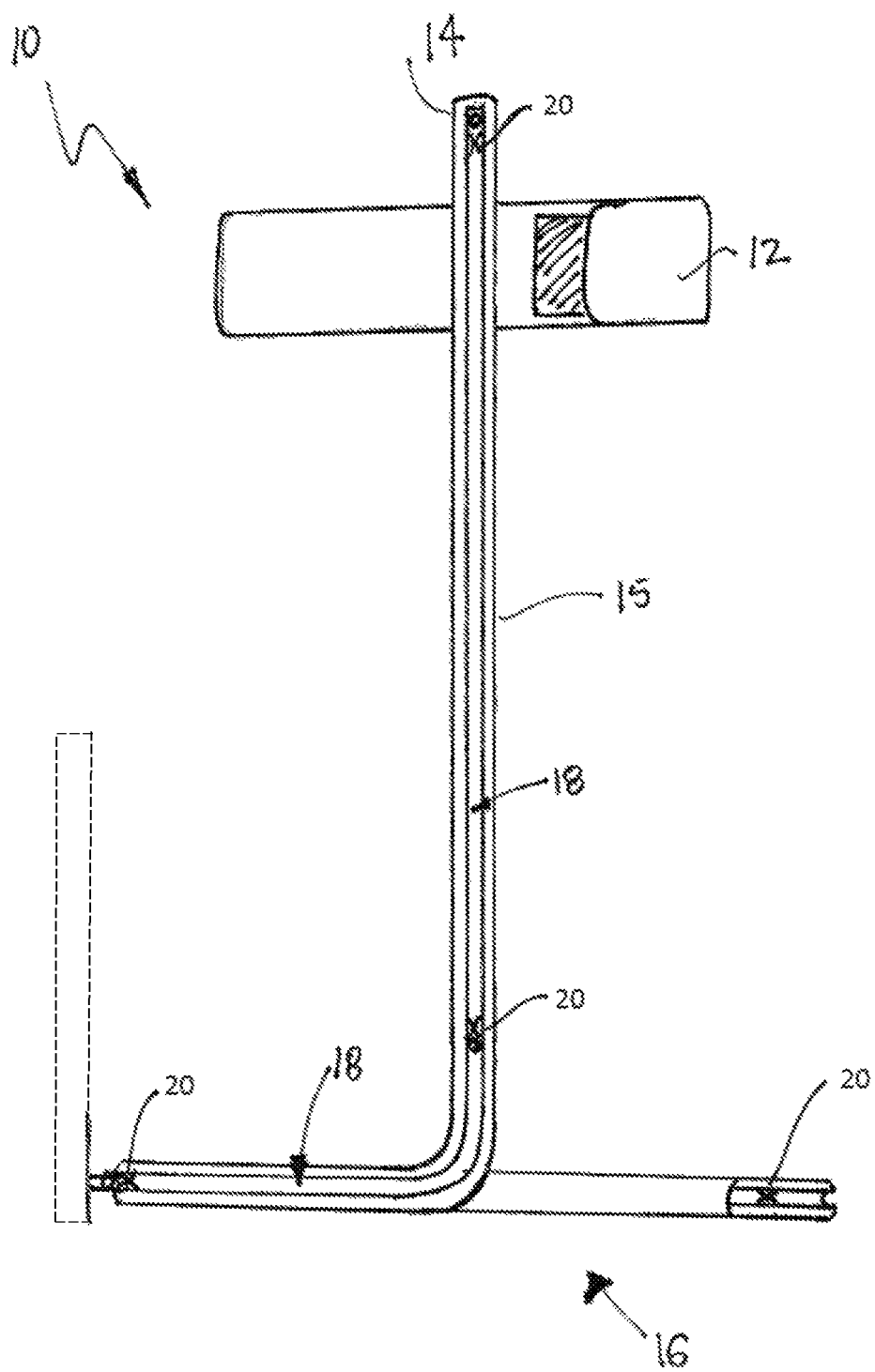
FIG. 4 is a plan view of the mounting arrangement of FIG. 1 depicting the manner in which the retaining element is employed to capture the phone in various positions.

Referring to FIGS. 2 and 3, each mobile phone 30 may be fitted with a locating member 25 mounted to a rear surface thereof. The locating member 25 has a pad portion 27 that comprises an adhesive that attaches to the rear surface of the phone 30, or a cover of the phone 30. A stem portion 26 extends from the pad portion 27 beyond the rear surface of the phone 30 and terminates in a knob or ball portion 28. The knob or ball portion 28 of the locating member 25 is configured so as to be snugly accommodated within the hollow tubular body of the track member 14 with the stem portion 26 extending through the slot 18 as is depicted in FIGS. 4 and 5. The knob or ball portion 28 is surface treated to enable the phone to freely slide along the track member 14 between the retaining elements 20 under movement of the user's hand.

As is shown in FIG. 5, when the locating member 25 of the phone 30 is attached within the track member 14 of the mounting arrangement 10, the user can simply move the phone 30 about the track member 14 by twisting or jolting their forearm. It will be appreciated that the mounting arrangement could be worn under a loose long sleeve shirt or jacket, so as to be concealed. In this regard, when not in use, the phone 30 may be positioned in position 'A', where the phone is concealed from use. In this "rest" position 'A', the retaining elements 20 provided within the hollow body of the track member 14 grips and holds the ball portion 28 of the locating member 25 of the phone 30. To access the phone 30, the user is required to move the phone from position 'A' to position 'B' where the phone is located within the palm of the user's hand. To achieve this, the user simply jolts their arm in the direction of arrow 'D'. This force causes ball portion 28 of the locating member 25 to become released from the retaining elements 20 present within the hollow body of the track member 14 such that the phone 30 can slide unimpeded towards the next retaining elements present in the hollow body of the track member 14 adjacent the base of the user's hand. The user can then simply use the phone 30 as required. To return the phone 30 to the "rest" position 'A', the user can simply jolt their arm in the opposite direction to arrow 'D' and allow the phone 30 to slide back into position 'A'.

If the user wishes to store their phone 30 on top of their forearm in position 'C', they can simply twist their forearm in the direction of arrow 'E', to enable the phone 30 to overcome the retaining elements in position 'A' and be captured by the retaining elements in position 'C' in the same manner as discussed above.

It will be appreciated that the embodiment as shown and described above in relation to FIGS. 1-5 provides a simple and effective means for accessing a phone in an unobtrusive yet effective manner. The phone can freely slide between storage positions depending on the requirements of the user by a simple body action, whilst keeping their hands free. It will be appreciated that the embodiment of FIGS. 1-5 may be varied by providing fibre optics within the track member that light up upon use and by extending the track member about the hand or arm of the user, for aesthetic purposes.

In this regard, when the phone 30 is in the palm of the user's hand, namely position B of FIG. 5, the track member 15 can be extended telescopically with extension tracks 60 and 61 extendable beyond the hand of the user. The extension tracks 60, 61 can be simply gripped by the user and extended to provide an extended track 60, 61 extending at least 300 mm beyond the user's hand (other lengths are also envisaged). The phone 30 is able to travel along the extended track members 60, 61 with the end of track member 61 being configured to enabling the phone 30 rotate or slide away from the track 61 to take a photograph in any direction. A wire (not shown) may extend within the extension tracks 60, 61 so as to be attached at one end to the input plug of the phone 30 and at the other end to a button switch (not shown) which may be located on the end of the track member 15. In this regard, the user can use their thumb to activate the button switch to take the photo. In an alternative embodiment, the extension tracks 60, 61 may alternatively be a foldable flat rod that can be separately attached to the track member 15 so that the phone 30 can be attached at an end thereof.

Figure 6:
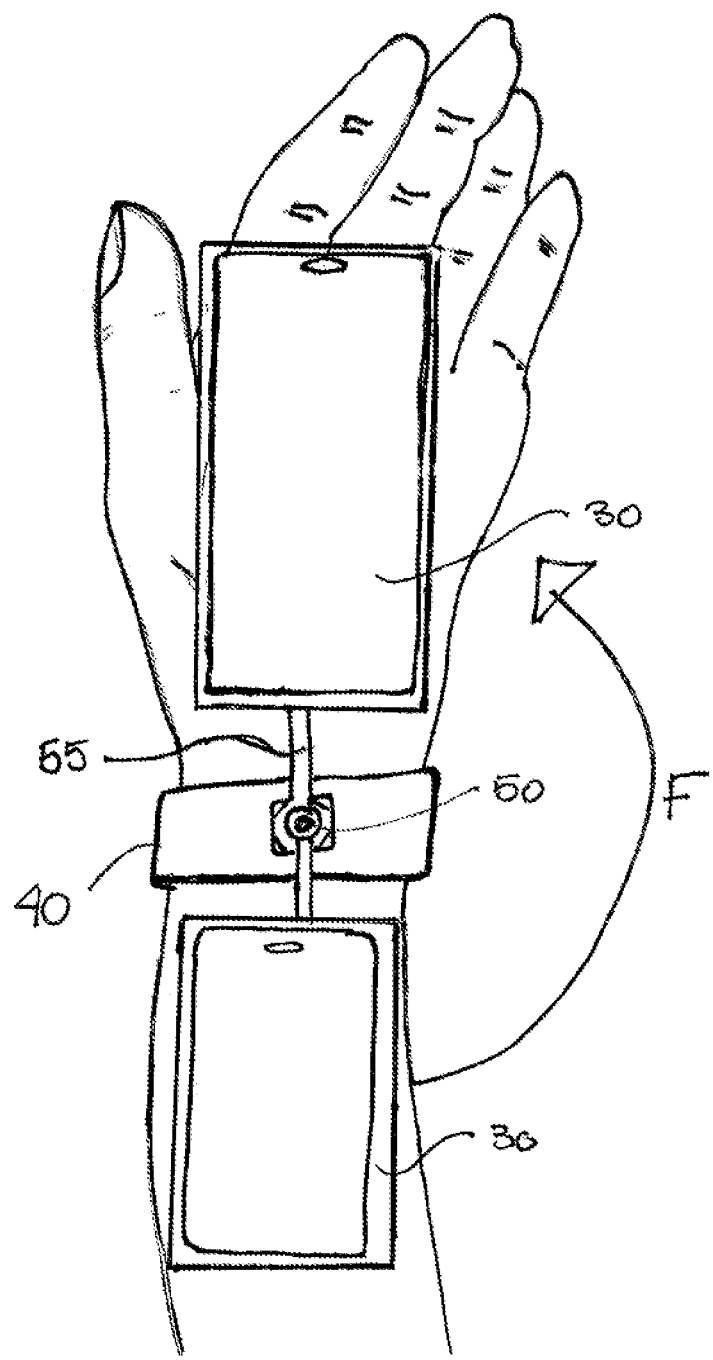
FIG. 6 is a view of an alternative embodiment of a body worn mobile phone mounting arrangement of the present invention.
Figure 7:
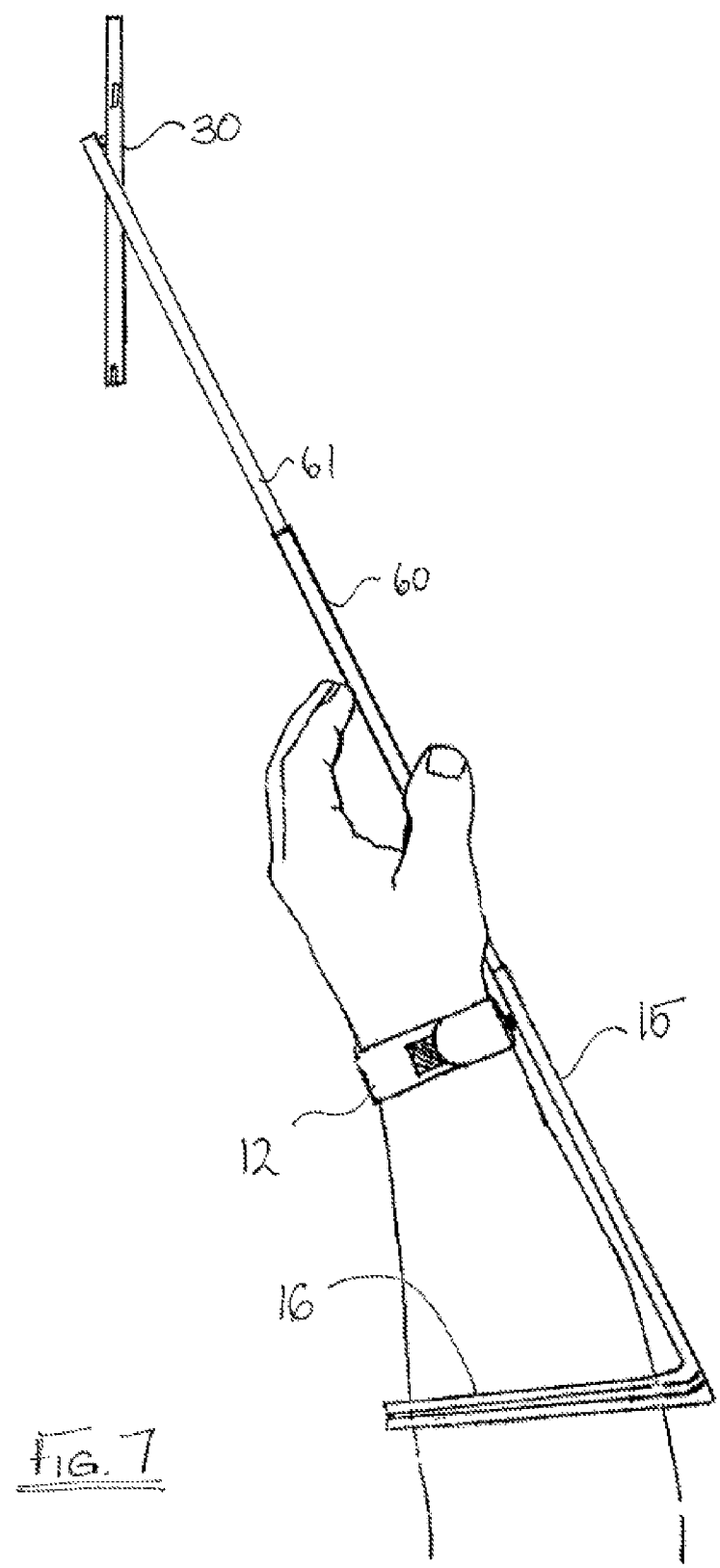
FIG. 7 is a side view of the embodiment of FIGS. 1-4 adapted for use as a "selfie stick".

Yet another embodiment of the present invention is depicted in FIG. 6. In this embodiment, the phone 30 is mounted to a wristband 40 via a pivot arm 55 mounted to a pivot point 50. Pivot arm 55 is also pivotally mounted at the rear of the phone 30 by way of a connector (not shown). This enables the phone to be orientated in the same upright manner when in the user's hand or when in the stored position. In this embodiment, by the user performing a waving function the phone 30 can be caused to move in a swinging motion in the direction of arrow F to extend from a position below the wrist of the user to a position within the palm of the user's hand for use. The pivot point may have a braking mechanism that requires a threshold force to overcome to facilitate movement in the direction of arrow F such that the phone is retained in the use position or the stored position. To return the phone to the stored position, the user can simply perform the same wave motion.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The claims defining the invention are as follows:

1. A body worn mounting system for a smart phone comprising:
    a band member attachable about an arm of a user;
    a track member mounted to the band member and configured to extend at least partially along the forearm of the user, the track member comprising a hollow tubular member having a slot formed on an outer surface thereof, the slot being configured to capture a ball portion mounted on a stem portion attached to a rear surface of the smart phone such that the smart phone is free to travel along the track member between predetermined positions on the track member;
    wherein, motion is applied to the smart phone through the application of a hand motion which applies a force to the smart phone causing the smart phone to slide along the slot of the track member.

2. A body worn mounting system according to claim 1, wherein the band member is attachable about a wrist of the user.

3. A body worn mounting system according to claim 2, wherein one end of the track member is mounted to an outer surface of the band member and extends along an inner surface of the forearm of the user away from the user's hand.

4. A body worn mounting system according to claim 3, wherein the track member is configured to extend around the user's arm at a distal end thereof, said distal end being opposite the end of the track member mounted to the band member.

5. A body worn mounting system according to claim 1, wherein the track member comprises a telescopically extendible portion that extends from the end mounted to the other surface of the hand member so as to extend beyond the hand of the user to facilitate positioning of the smart phone at a location to take self-images of the user from a camera system associated with the smart phone.

6. A body worn mounting system according to claim 1, wherein the track member comprises retaining elements provided therein for gripping the locating member and retaining the smart phone in position with respect to the user's arm.

* * * * *